Patented Feb. 8, 1938

2,108,001

UNITED STATES PATENT OFFICE 2,108,001

STABLE FILM-FORMING MATERIAL AND METHOD OF MAKING SAME

Walter Durgin Bowlby, Meriden, N. H.

No Drawing. Application June 29, 1935,
Serial No. 29,176

8 Claims. (Cl. 106—37)

This invention relates to the art of stabilizing film-forming materials and in particular it relates to the intimate association of alkaline soaps with fibrous materials which are soluble in organic solvents and which normally liberate destructive acids of decomposition.

Prior art discloses merely prolonged soda boiling treatments for stabilization but does not appear to disclose the present method which not only produces material stable at time of manufacture but also material which remains stable thruout the period of its usefulness.

An object of the invention relates to the provision of extra stable and continuously stable cellulose and rubber derivatives. A more specific object relates to the treatment and admixture of fibrous film-forming materials with soaps. Such materials have prolonged usefulness, improved stability and durability are less corrosive in coating solutions and have wide application in the industries.

Other objects of the invention will become apparent from the following detailed description of the invention.

The objects of the invention are accomplished by the intimate association of certain soaps with film-forming materials which are in the fibrous, solution, plastic, dehydrated or water-wet form. For this purpose film-forming materials such as nitro-cellulose, cellulose acetate, and chlorinated rubber are used. These materials have always had the objection of liberating corrosive acids of decomposition such as nitric, acetic and hydrochloric acids. The soaps which are used are those whose properties are similar to sodium lauryl sulphate, ammonium resinate and sodium oleate. Such soaps are slightly alkaline and were unexpectedly found to act as efficient neutralizers of the freed acid of decomposition without the well known destructive action of ordinary alkalis on the film-forming material itself. The counteraction and neutralization of these acids as they are formed by the normal aging processes prevents said acid from further destruction of the film-forming material and protects the ultimate products as well as the substances upon which such materials are coated. The normal rate of decomposition is markedly slowed up thus providing products much superior to the present commercial grades which are so unstable as to require reworking every six months which leads to great expense and inconvenience.

These acids of decomposition have always hindered the usefulness of the film-forming materials. Nitric acid which is liberated by nitrocellulose upon aging causes lowered stability, sensitiveness to spontaneous explosion, corrosiveness to metal surfaces and poor resistance to sun and weather as is evidenced by its notoriously poor chalking properties. The acetic acid which is slowly liberated by cellulose acetate causes sourness of the material, poor solubility and sensitiveness to water and light. The hydrochloric acid which is liberated by chlorinated rubber causes considerable corrosiveness of its containers, brittleness of films, discoloration of coatings and general all around poor qualities.

The successful removal of these deleterious acids was a serious and apparently hopeless problem. Additions of caustic materials always accelerated decomposition, lowered viscosities and degraded the film-forming material to a point where it had little if any tensil strength.

Intimate addition of such soaps as sodium lauryl sulphate does accomplish the long-sought result. Such soaps do not accelerate but inhibit the decomposition of the film-forming materials. Said soaps improve the stability and are excellent substances for close association with said cellulose and rubber derivatives.

Typical modes of preparing such film-forming materials are illustrated in the following examples:

Example A

Processed nitrocellulose is placed in a hydraulic press and put under pressure of approximately one thousand pounds per square inch. An equal weight or more of substantially a five percent mixture of sodium lauryl sulphate in ethyl or butyl alcohol is pumped thru the compressed nitrocellulose. The pressure is increased several hundred pounds for an interval of a few seconds, after which the new type of nitro-cellulose is removed and is ready for packing. Its composition is substantially as follows:

| Ingredients | Parts by weight |
|---|---|
| Cellulose nitrate | 35 |
| Water | 1 |
| Alcohol | 12 |
| Soap | 3 |

This composition is extra stable not only in this state but also when dissolved up and cast into protective coatings or films or used in explosives, plastics and adhesives. The soap remains intimately associated with the nitrocellulose and protects it as well as the materials on which it is applied from the deleterious effects of the nitric acid of decomposition.

Example B

Processed cellulose acetate is allowed to fall thru a tall drying tower in the top section of which is sprayed a twenty five percent solution of sodium oleate in water. The final dried product has the following composition:

| Ingredients | Parts by weight |
|---|---|
| Cellulose acetate | 95 |
| Soap | 5 |

This material is very stable to light and does not turn sour upon aging. Its use in safety glass and airplane coatings is very desirable.

Example C

Processed waterwet chlorinated rubber is placed in a centrifuge which is rotated at the rate of several thousand revolutions per minute. A small amount of a thirty percent solution of ammonium resinate in water is sprayed over the chlorinated rubber. After several minutes of wringing the material is removed and thoroughly dried by heat. The final product has the following composition:

| Ingredients | Parts by weight |
|---|---|
| Chlorinated rubber | 90 |
| Soap | 10 |

This material has better stability than the untreated material. No odors of chlorine or hydrochloric acid are noticeable after this product has aged for some time. It is free of corrosive action upon containers. It possesses unusual qualities even when made up into paints or films. The presence of soap does not affect any of the properties which make chlorinated rubber an interesting ingredient in protective and industrial coatings.

Thus film-forming materials impregnated with a minor quantity of a soap are found to be desirable products. They possess better stability and greater ease of fabrication. The treatment with soap solutions also produces cleaner material for lacquers since it removes much dirt, grease and oil which are picked up during manufacture.

This treatment with soaps can be made continuous by the proper machine adaptation.

These stable film-forming materials can be made up into solutions by dissolving them in suitable aromatic and aliphatic hydrocarbons, alcohols, esters and chlorinated aliphatic or aromatic hydrocarbon solvents such as toluene, naphtha, butyl alcohol, butyl and hexyl acetate and chlorinated naphthalines. Even two phase solutions work satisfactorily. Ordinary paint ingredients may be added as pigments, plasticizers, resins gums, synthetic resins, flattening agents, bronzes, crystallizing chemicals and the like.

Excellent smokeless powders and dynamites can be made from nitrocotton which is treated as shown above. Lacquer films are less chalking and more stable to light and weather. In fact improvements heretofore unknown to the art are now made possible.

The desired amount of admixed soap is a minor quantity such as twenty five percent or less, preferably less than ten percent as based upon the weight of film-forming material.

The invention will be considered as including within its scope all acid-liberating coating materials processed and used as above described. The invention will also be considered as including within its scope all alkaline soaps having the properties of sodium lauryl sulphate.

The above description and specific samples are to be taken as illustrative only. Any variation or departure therefrom which conforms to the spirit of the invention is intended to be included within the scope of the claims.

I claim:

1. Nitrocellulose impregnated under pressure with an alkali-metal soap.
2. Processed nitrocellulose impregnated under pressure with a water-soluble soap.
3. As a new composition of matter, fibrous nitrocellulose having incorporated under pressure therewith a minor quantity of an alkali-metal soap, effective as a stabilizer for said nitrocellulose.
4. Cellulose nitrate in its newly manufactured fibrous state stabilized by pressure impregnation of from 1–10 percent of a water-soluble soap.
5. A stable product comprising substantially five percent by weight of a water-soluble soap deposited under pressure on processed nitrocellulose.
6. Method of stabilizing processed nitrocellulose comprising a pressure treatment with a water-soluble soap.
7. In the process of treating fibrous nitrocellulose, the step which comprises subjecting said nitrocellulose to several hundred pounds' pressure in the presence of a soap and an aliphatic alcohol so that the soap is permanently affixed to the fibers of said nitrocellulose whereby a stable material is obtained.
8. Process of claim 6 wherein the soap is sodium lauryl sulphate.

WALTER D. BOWLBY.